(12) United States Patent
Li et al.

(10) Patent No.: US 10,293,385 B2
(45) Date of Patent: May 21, 2019

(54) FOREIGN SUBSTANCE COLLECTION STRUCTURE, DISPLAY DEVICE AND OPERATION METHOD THEREOF

(71) Applicants: BOE Technology Group Co., Ltd., Beijing (CN); Hefei Xinsheng Optoelectronics Technology Co., Ltd., Hefei (CN)

(72) Inventors: Hailong Li, Beijing (CN); Yudong Liu, Beijing (CN); Xiong Xiong, Beijing (CN); Xiaozhe Zhang, Beijing (CN); Ning Wang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 15/816,488

(22) Filed: Nov. 17, 2017

(65) Prior Publication Data
US 2018/0264527 A1    Sep. 20, 2018

(30) Foreign Application Priority Data
Mar. 20, 2017   (CN) .......................... 2017 1 0167091

(51) Int. Cl.
*B08B 7/00*   (2006.01)
*G02B 27/00*   (2006.01)

(52) U.S. Cl.
CPC ........ *B08B 7/0028* (2013.01); *G02B 27/0006* (2013.01)

(58) Field of Classification Search
None
See application file for complete search history.

(56) References Cited

U.S. PATENT DOCUMENTS

2010/0123849 A1    5/2010   Matsushima

FOREIGN PATENT DOCUMENTS

| CN | 101069962 A | 11/2007 |
| CN | 101738757 A | 6/2010 |
| CN | 102951345 A | 3/2013 |
| CN | 103567164 A | 2/2014 |
| CN | 204934134 U | 1/2016 |
| CN | 105810123 A * | 7/2016 ............. G09F 13/22 |
| CN | 105834168 A | 8/2016 |

(Continued)

OTHER PUBLICATIONS

Nov. 8, 2018—(CN) First Office Action Appn 201710167091.1 with English Translation.

*Primary Examiner* — Kristy A Haupt
(74) *Attorney, Agent, or Firm* — Banner & Witcoff, Ltd.

(57) ABSTRACT

A foreign substance collection structure, a display device and an operation method thereof are provided. The foreign substance collection structure includes a frame and a first baffle plate. The frame includes a first inside wall, the first baffle plate is configured to move toward the first inside wall. The first baffle plate includes a first surface and is capable of being moved from a position away from the first inside wall to a position where the first surface of the first baffle plate faces the first inside wall; an adhesive layer is disposed on at least one of the first inside wall and the first surface, and the adhesive layer is configured to bond foreign substances appearing on the first inside wall and/or the first surface.

20 Claims, 9 Drawing Sheets

(56) References Cited

FOREIGN PATENT DOCUMENTS

| CN | 106001007 A | 10/2016 |
|----|-------------|---------|
| CN | 106028690 A | 10/2016 |
| CN | 106847083 A | 6/2017 |
| KR | 1020140013995 A | 2/2014 |

* cited by examiner

FOREIGN SUBSTANCE COLLECTION STRUCTURE, DISPLAY DEVICE AND OPERATION METHOD THEREOF

CROSS-REFERENCE

This application claims priority to and the benefit of Chinese Patent Application No. 201710167091.6, filed Mar. 20, 2017, which application is incorporated herein in its entirety.

TECHNICAL FIELD

Embodiments of the present disclosure relate to a foreign substance collection structure, a display device and an operation method thereof.

BACKGROUND

Currently, due to the influence of uncertain factors such as the standard operating procedures (SOPs) of production line environments, product processes or production lines, in the processes such as the assembly or detection of electronic products, environmental foreign substances can easily enter, for instance, a backlight module, a space between layers of a display panel (foreign substances in films), or a space between the backlight module and the display panel (foreign substances on the outside of films). Due to the foreign substances, poor image quality such as white spots and white dirt of the display panel tends to occur after product transport or mechanical reliability test. For instance, as for a touch panel product, foreign substances with the size of a dozen microns will adhere to the touch panel, and the display panel may have poor image quality such as severe white dirt and white spots after drop test, vibration test and other actions, so the product quality and yield can be severely affected.

Currently, the interception of foreign substances mainly relies on the measures such as environmental control in dust-free workshops and image quality inspection by the quality department before shipment. In actual production, considering the protection of electronic components on a chip on film (COF) and/or a printed circuit board (PCB), in the processes of production, inspection and shipment of electronic products, one side of a display panel bonded with a PCB is placed upwards, and partial foreign substances on the inside and outside of films fall down and are gathered on an opposite side of one side of the display panel bonded with the PCB at this stage, for instance, the foreign substances fall into gaps between the display panel and a frame of a backlight module, and hence cannot be effectively detected; and after the assembling the electronic products into a complete set, one side of the display panel bonded with the PCB is placed downwards, and foreign substances will fall onto active area from the gaps, resulting in display distortion, poor quality and the like and reducing the product yield.

SUMMARY

At least one embodiment of the present disclosure provides a foreign substance collection structure, which comprises: a frame comprising a first inside wall and a first baffle plate configured to move toward the first inside wall. The first baffle plate comprises a first surface and is capable of being moved from a position away from the first inside wall to a position where the first surface of the first baffle plate faces the first inside wall. An adhesive layer is disposed on at least one of the first inside wall and the first surface, and the adhesive layer is configured to bond foreign substances appearing on the first inside wall and the first surface.

For example, the foreign substance collection structure provided by an embodiment of the present disclosure further comprises a first actuator, which is configured to move the first baffle plate from the position away from the first inside wall to the position where the first surface of the first baffle plate faces the first inside wall.

For example, in the foreign substance collection structure provided by an embodiment of the present disclosure, the first inside wall or the first surface is a rough surface, or both the first inside wall and the first surface are rough surfaces.

For example, in the foreign substance collection structure provided by an embodiment of the present disclosure, the first actuator comprises a first component and a second component; the first component is disposed on the first baffle plate; the second component is disposed on the frame; and the first actuator is configured to rotate the first baffle plate from the position away from the first inside wall to the position where the first surface of the first baffle plate faces the first inside wall.

For example, in the foreign substance collection structure provided by an embodiment of the present disclosure, the frame further comprises an inner bottom surface; the first baffle plate further comprises a second surface facing the inner bottom surface, the first component is disposed on the second surface and the second component is disposed on the inner bottom surface; or the first component is disposed on the first surface and the second component is disposed on the first inside wall.

For example, in the foreign substance collection structure provided by an embodiment of the present disclosure, the first actuator comprises a spring or a hinge.

For example, the foreign substance collection structure provided by an embodiment of the present disclosure further comprises at least one lock piece configured to fix the first baffle plate at the position away from the first inside wall.

For example, in the foreign substance collection structure provided by an embodiment of the present disclosure, the first baffle plate further comprises a first lock structure; and the first lock structure is configured to be engaged with the lock piece to fix the first baffle plate at the position away from the first inside wall.

For example, in the foreign substance collection structure provided by an embodiment of the present disclosure, the first lock structure comprises a groove; and the lock piece is capable of being inserted into the groove.

For example, the foreign substance collection structure provided by an embodiment of the present disclosure further comprises a second baffle plate. The frame further comprises a second inside wall parallel to the first inside wall, the second baffle plate is configured to be able to move towards the second inside wall, comprises a third surface, and is capable of being moved from a position away from the second inside wall to a position where the third surface of the second baffle plate faces the second inside wall; and the adhesive layer is disposed on at least one of the second inside wall and the third surface.

For example, the foreign substance collection structure provided by an embodiment of the present disclosure further comprises a second actuator configured to move the second baffle plate from the position away from the second inside wall to the position where the third surface of the second baffle plate faces the second inside wall.

For example, in the foreign substance collection structure provided by an embodiment of the present disclosure, the second baffle plate further comprises a second lock structure which is configured to fix the second baffle plate at the position away from the second inside wall.

At least one embodiment of the present disclosure provides a display device, which comprises at least one foreign substance collection structure as mentioned above.

For example, the display device provided by an embodiment of the present disclosure further comprises a display panel and a backlight module. The display panel is provided with a bonding area; the backlight module comprises a backplane; and the foreign substance collection structure is disposed on a side of the backplane opposite to the bonding area.

At least one embodiment of the present disclosure provides an operation method for the display device as mentioned above, the operation method comprises: fixing the first baffle plate at the position away from the first inside wall; allowing the adhesive layer to bond foreign substances appearing on the first inside wall and/or the first surface of the first baffle plate; and moving the first baffle plate from the position away from the first inside wall to the position where the first surface of the first baffle plate faces the first inside wall.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
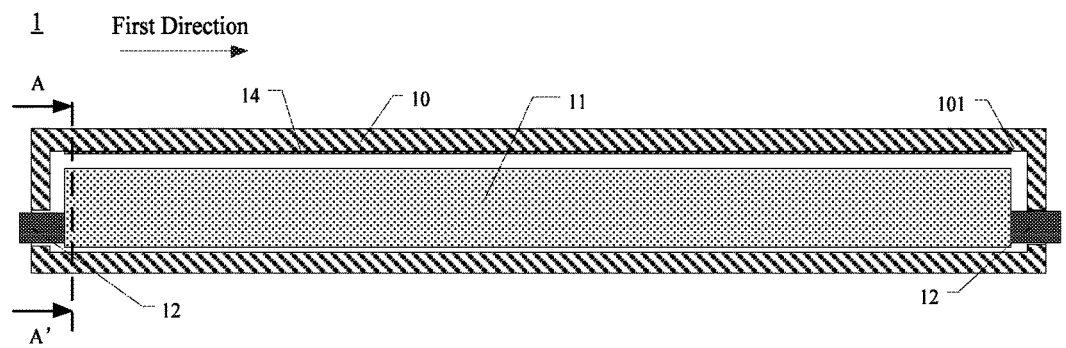
FIG. 1A is a schematic plan view illustrating a first state of a foreign substance collection structure provided by an embodiment of the present disclosure.

In order to make objects, technical details and advantages of the embodiments of the present disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "Over," "under," "right," "left" and the like are only used to indicate relative position relationship, and when the position of the object which is described is changed, the relative position relationship may be changed accordingly.

It should be noted that in the description of the present disclosure, "movement" may include rotational movement and may also include parallel movement.

In actual production, in order to protect electronic components on a COF and/or a PCB, in the processes of production, inspection and shipment of the electronic products, one side of a display panel bonded with a PCB is all placed upwards in the vertical direction, and partial environmental foreign substances fall down and are gathered on an opposite side of one side of the display panel bonded with the PCB at this stage, for instance, the environmental foreign substances fall into gaps between the display panel and a frame of a backlight module, and hence cannot be effectively detected; and after the electronic products are assembled into a complete set, the electronic products are inverted, namely one side of the display panel bonded with the PCB is placed downwards in the vertical direction, and foreign substances will fall onto an active area from the gaps, resulting in poor image quality of the active area such as severe white dirt and white spots. Thus, the display quality can be reduced, display distortion can be even caused, and the product yield can be reduced.

At least one embodiment of the present disclosure provides a foreign substance collection structure, a display device and an operation method thereof. The foreign substance collection structure comprises a frame and a first baffle plate. The frame comprises a first inside wall; the first baffle plate is configured to move toward the first inside wall, the first baffle plate comprises a first surface and is capable of being moved from a position away from the first inside wall to a position where the first surface of the first baffle plate faces the first inside wall; an adhesive layer is disposed on at least one of the first inside wall and the first surface, and the adhesive layer is configured to bond foreign substances appearing on the first inside wall and the first surface.

In the foreign substance collection structure, an adhesive layer is disposed on a first inside wall and/or a first surface, and the adhesive layer is configured to bond foreign substances appearing on the first inside wall and/or a first baffle plate; after the assembling a display device into a complete set, the first inside wall is bonded with the first surface in face-to-face; and the foreign substances are completely sealed into the foreign substance collection structure, so as to effectively avoid the escape of the foreign substances and achieve the control of the foreign substances. Thus, the quality and the yield of the display device providing with the foreign substance collection structure can be improved.

It should be noted that: in the following description on the embodiments of the present disclosure, "a first state" refers to a state in which the first baffle plate is fixed at a position away from the first inside wall and/or a second baffle plate is fixed at a position away from a second inside wall; for instance, in the processes such as the production, inspection, reliability test and shipment of the electronic products, the foreign substance collection structure may be in "the first state"; "a second state" refers to a state in which the first baffle plate is at a position where the first surface of the first baffle plate faces the first inside wall and/or the second baffle plate is at a position where a third surface of the second baffle plate faces the second inside wall; and for instance, after the electronic products are assembled into a complete set, the foreign substance collection structure may be in "the second state".

Detailed description will be given below to the present disclosure with reference to several embodiments, but the present disclosure is not limited to the specific embodiments.

First Embodiment

Figure 1B:
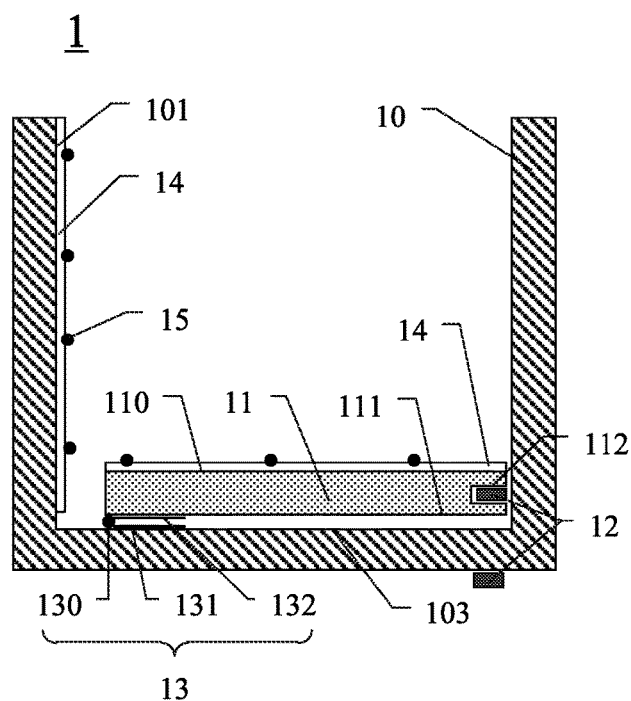
FIG. 1B is a schematic structural sectional view of the foreign substance collection structure along a A-A' line in FIG. 1A.
Figure 1C:
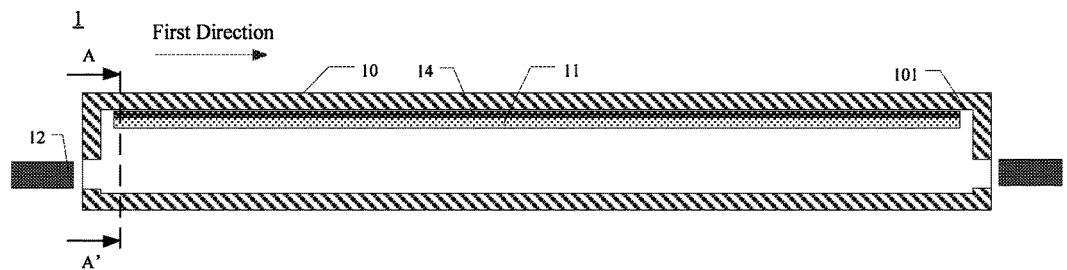
FIG. 1C is a schematic plan view illustrating a second state of the foreign substance collection structure provided by an embodiment of the present disclosure.
Figure 1D:
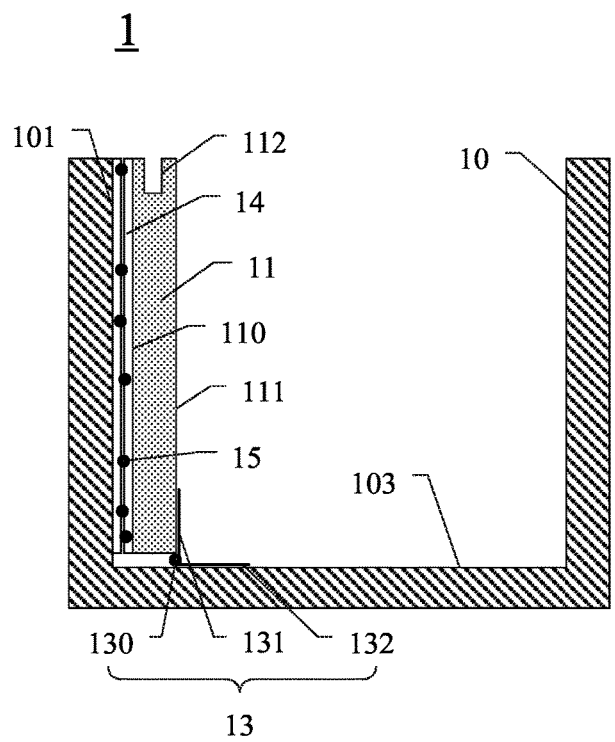
FIG. 1D is a schematic structural sectional view of the foreign substance collection structure along a A-A' line in FIG. 1C.
Figure 2A:
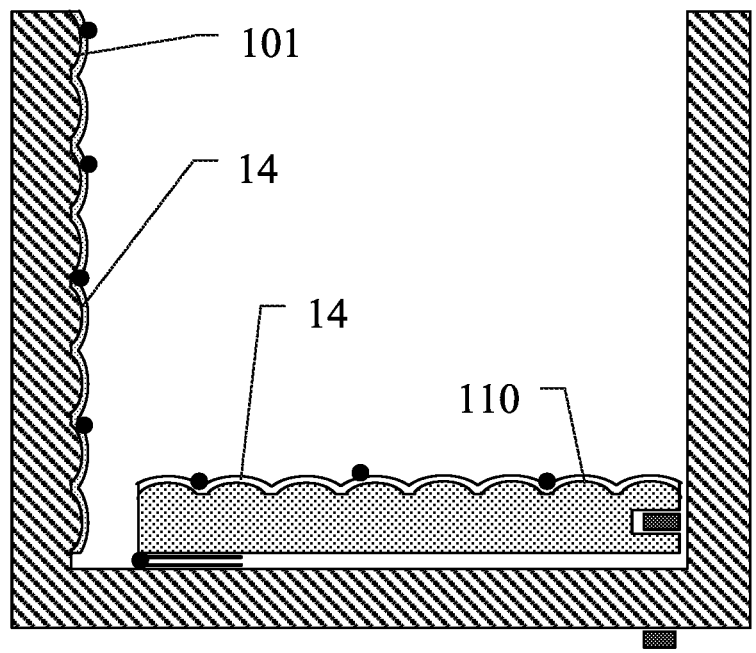
FIG. 2A is a schematic structural sectional view illustrating a first state of another foreign substance collection structure provided by an embodiment of the present disclosure.
Figure 2B:
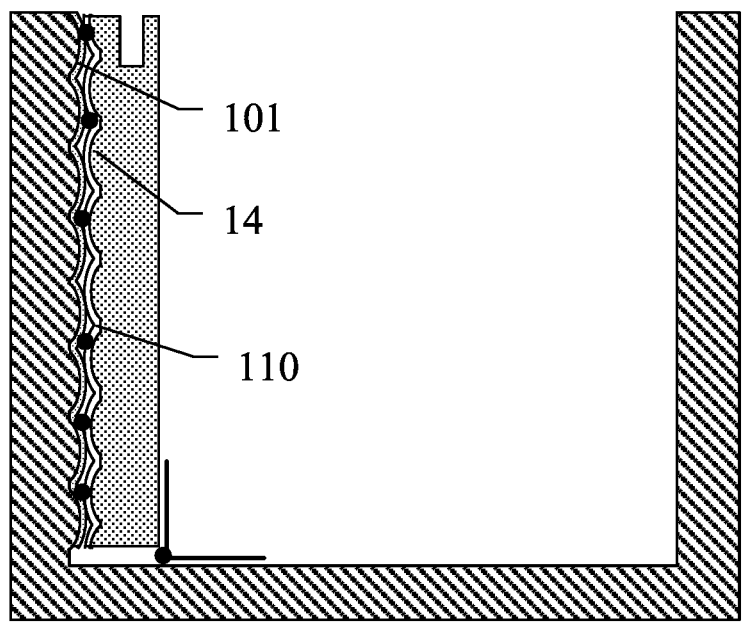
FIG. 2B is a schematic structural sectional view illustrating a second state of another foreign substance collection structure provided by an embodiment of the present disclosure.

FIG. 1A is a schematic plan view illustrating a first state of a foreign substance collection structure provided by an embodiment of the present disclosure; FIG. 1B is a schematic structural sectional view of the foreign substance collection structure along a A-A' line in FIG. 1A; FIG. 1C is a schematic structural view illustrating a second state of the foreign substance collection structure provided by an embodiment of the present disclosure; FIG. 1D is a schematic structural sectional view of the foreign substance collection structure along the A-A' line in FIG. 1C; FIG. 2A is a schematic structural sectional view illustrating a first state of another foreign substance collection structure provided by an embodiment of the present disclosure; and FIG. 2B is a schematic structural sectional view illustrating a second state of another foreign substance collection structure provided by an embodiment of the present disclosure.

For instance, as shown in FIGS. 1a and 1b, the embodiment provides a foreign substance collection structure 1. The foreign substance collection structure 1 may comprise: a frame 10 and a first baffle plate 11. The frame 10 may comprise a first inside wall 101; the first baffle plate 11 is configured to move towards the first inside wall 101, the first baffle plate 11 may comprise a first surface 110 and is capable of being moved from a position away from the first inside wall 101 to a position where the first surface 110 of the first baffle plate 11 faces the first inside wall 101. An adhesive layer 14 is disposed on at least one of the first inside wall 101 and the first surface 110, and the adhesive layer 14 is configured to bond foreign substances 15 appearing on the first inside wall 101 and/or the first surface 110.

For instance, as shown in FIGS. 1a and 1b, when the foreign substance collection structure 1 is in the first state, the adhesive layer 14 on the first inside wall 101 and/or the first surface 110 may bond and collect the foreign substances 15 appearing on the adhesive layer 14; and as shown in FIGS. 1c and 1d, when the foreign substance collection structure 1 is in the second state, the first inside wall 101 and the first surface 110 are oppositely bonded in face-to face to form a first slit, and the foreign substances 15 are fixed into the first slit, so as to effectively avoid the escape of the foreign substances 15 and achieve the control of the foreign substances 15.

For instance, the material and the structure of the adhesive layer 14 may comprise viscose, a electrostatic film, adsorption fiber, etc. For instance, the viscose may be organic glue (e.g., epoxy adhesive, polyurethane adhesive or organic silica adhesive, etc.) or inorganic glue (e.g., water glass adhesive, silicate adhesive or phosphate adhesive, etc.). The foreign substances are fixed on the first inside wall 101 and/or the first surface 110 by utilization of the adhesion of the viscose. For instance, the electrostatic film may be a conductive film (e.g., a metallic film or an indium tin oxide (ITO) film). In the first state, static electricity may be applied to the conductive film, and the foreign substances 15 are adsorbed onto the first inside wall 101 and/or the first surface 110 by utilization of the electrostatic adsorption phenomenon. For instance, the adsorption fiber may be activated carbon fiber and so on. Due to the surface effect of the activated carbon fiber, the foreign substances 15 are adsorbed onto the first inside wall 101 and/or the first surface 110.

It should be noted that: in the second state, when the adhesive layer 14 is the viscose, the viscose is disposed on at least one of the first inside wall 101 and the first surface 110, and the adhering of both may be realized by utilization of the adhesion of the viscose. For instance, the viscose may be disposed on both the first inside wall 101 and the first surface 110, so as to increase the adhesion between the first inside wall 101 and the first surface 110 and effectively prevent the first baffle plate 11 from falling; or magnetic materials with opposite polarity may be respectively disposed on the first inside wall 101 and the first surface 110, so as to realize the adhering of both by utilization of the magnetic adsorption of the magnetic materials.

For instance, the first inside wall 101 and/or the first surface 110 may be a rough surface. As shown in FIG. 2A, when the foreign substance collection structure 1 is in the first state, the rough surface may increase the surface area of the adhesive layer 14 for adhering the foreign substances 15 on the premise of not increasing the height of the foreign substance collection structure 1. As shown in FIG. 2B, when the foreign substance collection structure 1 is in the second state, for instance, a concave opening on the first inside wall 101 and a convex opening on the first surface 110 are bonded oppositely, and a convex opening on the first inside wall 101 and a concave opening on the first surface 110 are bonded oppositely, so as to increase the bonding firmness between the first inside wall 101 and the first surface 110 and effectively prevent the first baffle plate 11 from falling. On the other hand, the first inside wall 101 and the first surface 110 form a second slit which has a curved shape, therefore even the foreign substances 15 fall off due to, for instance, the friction between the first inside wall 101 and the first surface 110, the foreign substances 15 may also be fixed into the second slit with the curved shape, so as to further prevent the foreign substances 15 from escaping from the foreign substance collection structure 1.

It should be noted that the shape of the first inside wall 101 and/or the first surface 110 may be a periodic rough surface, for instance, may be a rough surface formed by periodic cylinders, prisms or triangles; and may also not be a periodic rough surface, for instance, may be a rough surface formed by a combination of a prism and a trapezoid.

For instance, as shown in FIG. 1B, the foreign substance collection structure 1 may further comprise a first actuator 13 which is configured to move the first baffle plate 11 from a position away from the first inside wall 101 to a position where the first surface 110 of the first baffle plate 11 faces the first inside wall 101.

For instance, the first actuator 13 comprises a connection component 130, a first component 131 and a second component 132; the first component 131 is disposed on the first baffle plate 11; the second component 132 is disposed on the frame 10; and the connection component 130 is configured to connect the first component 131 and the second component 132 and may apply force to the first component 131 and the second component 132, so as to ensure that the first baffle plate 11 can be rotated from the position away from the first inside wall 101 to the position where the first surface 110 of the first baffle plate 11 faces the first inside wall 101.

For instance, the frame 10 may further include an inner bottom surface 103; and the first baffle plate 11 may further include a second surface 111 facing the inner bottom surface 103. The first component 131, for instance, may be disposed on the second surface 111, and correspondingly, the second component 132 may be disposed on the inner bottom surface 103; or the first component 131 may be disposed on the first surface 110, and correspondingly, the second component 132 may be disposed on the first inside wall 101.

For instance, the first surface 110 is back to the inner bottom surface 103, and the first surface 110 and the inner bottom surface 103 may be parallel or inclined to each other. When the first surface 110 and the inner bottom surface 103 are inclined to each other, the surface area of the adhesive layer 14 disposed on the first surface 110 may be increased without increasing the width of the foreign substance collection structure 1.

It should be noted that the foreign substance collection structure 1 may include a plurality of first actuators 13. For instance, as shown in FIG. 1A, in a first direction, both ends of the first baffle plate 11 may be respectively provided with one first actuator 13, so as to more rapidly and effectively drive the first baffle 11 to move from the first state to the second state.

For instance, the first actuator 13 is a spring or a hinge. For instance, the spring may include a torsion bar spring, a coil spring (e.g., a torsion spring, a tension spring or a compression spring), a plate spring, etc.

It should be noted that the first baffle plate 11 may also be driven to move from the first state to the second state by manual means or motor drive means apart from the means of adopting a spring or a hinge.

For instance, the foreign substance collection structure 1 further comprises at least one lock piece 12 which is configured to fix the first baffle plate 11 at the position away from the first inside wall 101. For instance, the lock piece 12 may be clamped onto the first inside wall 101 and the first surface 110, so as to fix the first baffle plate 11 on the inner bottom surface 103.

For instance, as shown in FIG. 1B, the first baffle plate 11 may further comprise a first lock structure 112 which may be engaged with the lock piece 12 to fix the first baffle plate 11 at the position away from the first inside wall 101. For instance, the first lock structure 112 may include at least one first groove, and the lock piece 12 may be inserted into the first groove to fix the first baffle plate 11 on the inner bottom surface 103.

For instance, the number of the lock pieces 12 may be numerous. As shown in FIG. 1A, in the first direction, both ends of the first baffle plate 11 may be respectively provided with one lock pieces 12, so as to ensure that the first baffle plate 11 is completely fixed on the inner bottom surface 103 without the problem of deformation such as warping.

For instance, the lock piece 12 may have a U-shaped structure, an L-shaped structure, a flat plate structure, etc.

Figure 3A:
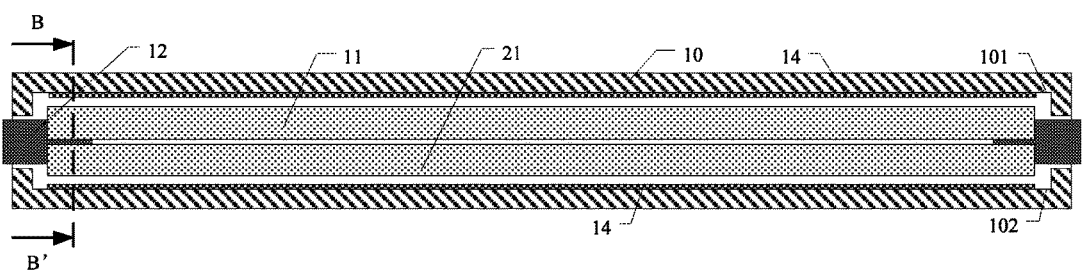
FIG. 3A is a schematic plan view illustrating a first state of another foreign substance collection structure provided by an embodiment of the present disclosure.
Figure 3B:
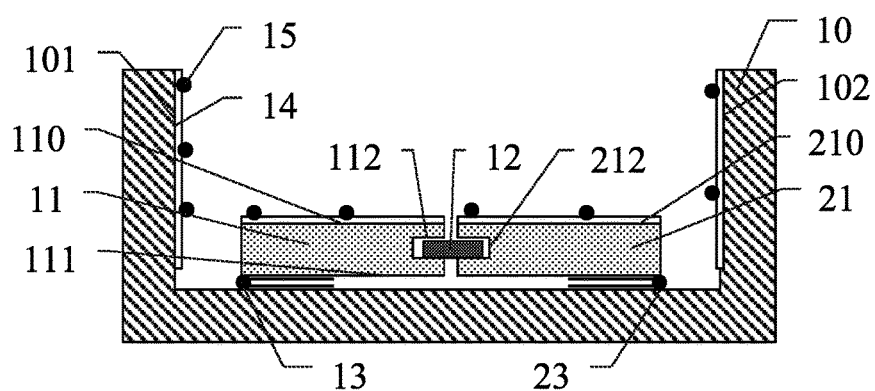
FIG. 3B is a schematic structural sectional view of the foreign substance collection structure along a B-B' line in FIG. 3A.
Figure 3C:
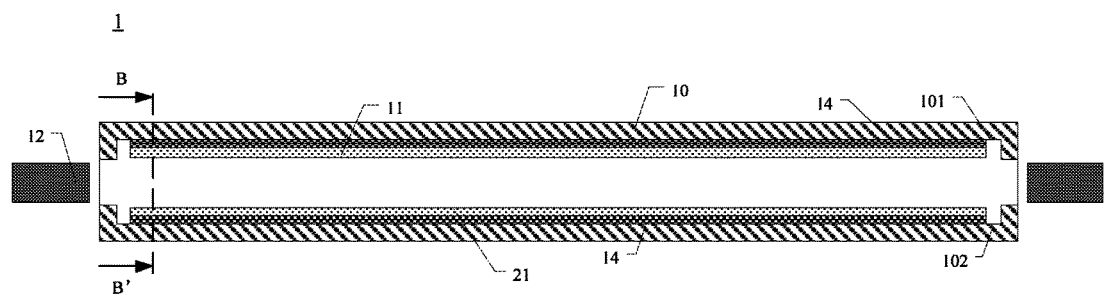
FIG. 3C is a schematic plan view illustrating a second state of another foreign substance collection structure provided by an embodiment of the present disclosure.
Figure 3D:
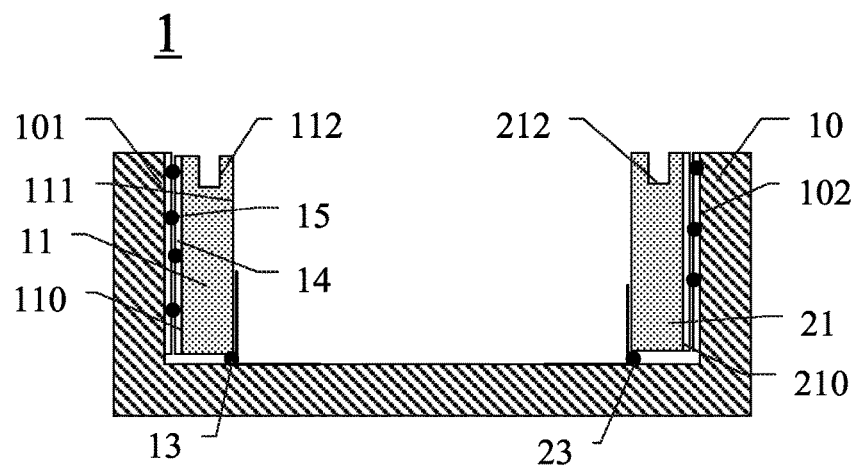
FIG. 3D is a schematic structural sectional view of the foreign substance collection structure along a B-B' line in FIG. 3C.

FIG. 3A is a schematic plan view illustrating a first state of another foreign substance collection structure provided by an embodiment of the present disclosure; FIG. 3B is a schematic structural sectional view of the foreign substance collection structure along a B-B' line in FIG. 3A; FIG. 3C is a schematic plan view illustrating a second state of another foreign substance collection structure provided by an embodiment of the present disclosure; and FIG. 3D is a schematic structural sectional view of the foreign substance collection structure along a B-B' line in FIG. 3C.

For instance, as shown in FIGS. 3a-3d, the foreign substance collection structure 1 may further comprise a second baffle plate 21; the frame 10 may further comprise a second inside wall 102 parallel to the first inside wall 101; the second baffle plate 21 is configured to move towards the second inside wall 102, may comprise a third surface 210, and is capable of being moved from a position away from the second inside wall 102 to a position where the third surface of the second baffle plate 21 faces the second inside wall 102; and the adhesive layer 14 is disposed on at least one of the second inside wall 102 and the third surface 210. Because the foreign substance collection structure 1 is provided with two baffle plates, the height of the foreign substance collection structure 1 can be reduced on the premise of keeping the width of the foreign substance collection structure 1 unchanged.

It should be noted that: when the width of the foreign substance collection structure 1 is wider, the area of the adhesive layer 14 of the foreign substance collection structure 1 is larger, so as to more completely collect the foreign substances 15 and prevent the escape of the foreign substances 15 as the foreign substances cannot make contact with a surface of the adhesive layer 14.

For instance, the second inside wall 102 and/or the third surface 210 may also be a rough surface, the surface shape of which may be the same with or different from that of the first inside wall 101 and/or the first surface 110. No limitation will be given herein.

For instance, the lock piece 12 may also be clamped onto the second inside wall 102 and the third surface 210 to fix the second baffle plate 21 on the inner bottom surface 103.

For instance, the second baffle plate 21 may further comprise a second lock structure 212 which may be engaged with the lock piece 12 to fix the second baffle plate 21 at the position away from the second inside wall 102.

For instance, the second baffle plate 21 may have the same shape and structure as the first baffle plate 11, and the first baffle plate 11 and the second baffle plate 21 may be disposed opposite to each other, so that the first lock structure 112 of the first baffle plate 11 and the second lock structure 212 of the second baffle plate 21 can face each other and hence engaged with the same lock piece 12. The second baffle plate 21 may also have different shape and structure with the first baffle plate 11. No limitation will be given here.

For instance, the second lock structure 212 may have the same shape as the first lock structure 112. For instance, the second lock structure 212 may comprise at least one second groove, and the second groove has the same shape as the first groove, so the same lock piece 12 can be simultaneously inserted into the first groove and the second groove to fix the first baffle plate 11 and the second baffle plate 21 on the inner bottom surface 103. It should be noted that the second lock structure 212 may also have different shape with the first lock structure 112, provided that the second lock structure 212 can fix the second baffle plate 21 on the inner bottom surface 103.

For instance, the foreign substance collection structure 1 may further comprise a second actuator 23 which is configured to move the second baffle plate 21 from the position away from the second inside wall 102 to the position where the third surface 210 of the second baffle plate 21 faces the second inside wall 102. The adopted means, the used tools, the number and the like of the second actuator 23 may be the same as or different from those of the first actuator 13, provided that the second actuator 23 can drive the second baffle plate 21 to move from the first state to the second state.

Figure 4A:
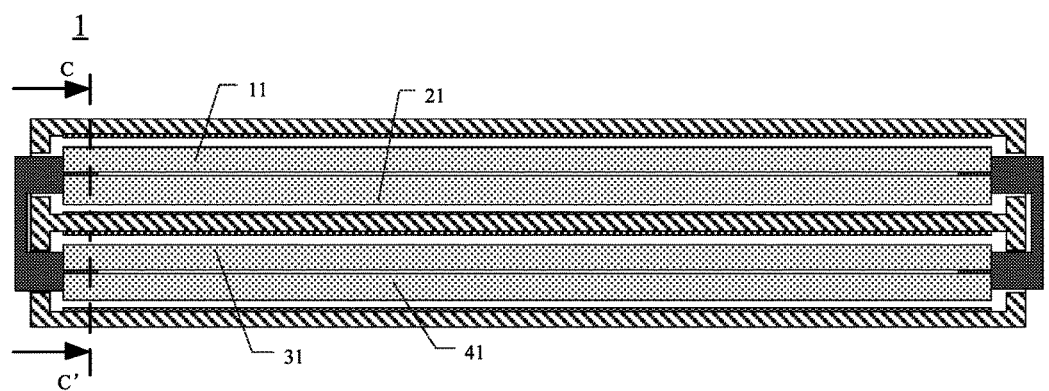
FIG. 4A is a schematic plan view illustrating a first state of still another foreign substance collection structure provided by an embodiment of the present disclosure.
Figure 4B:
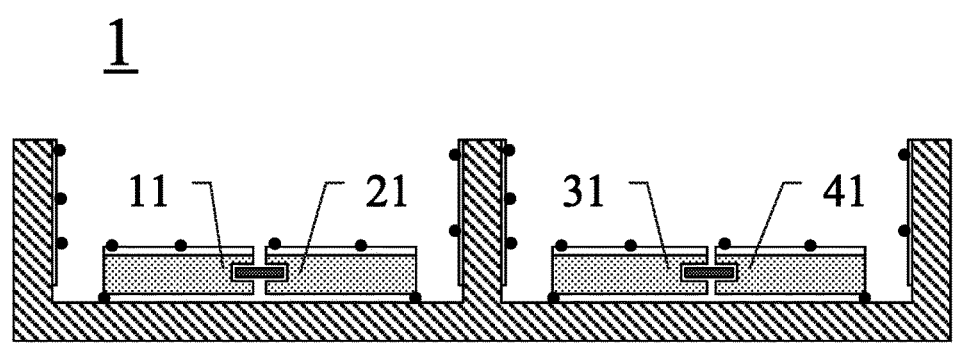
FIG. 4B is a schematic structural sectional view of the foreign substance collection structure along a C-C' line in FIG. 4A.
Figure 4C:
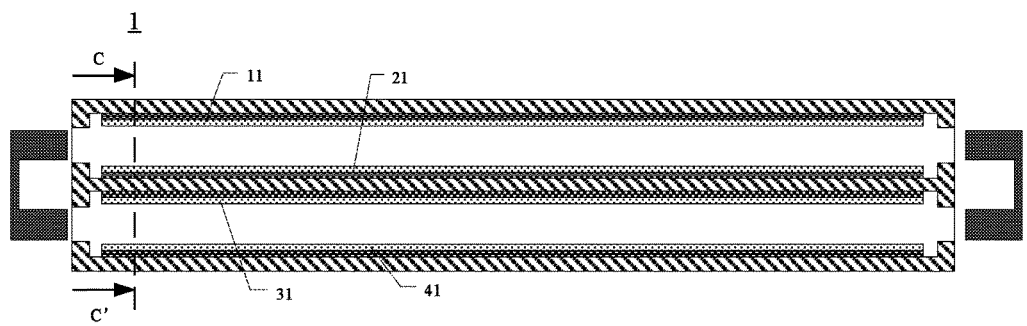
FIG. 4C is a schematic plan view illustrating a second state of still another foreign substance collection structure provided by an embodiment of the present disclosure.
Figure 4D:
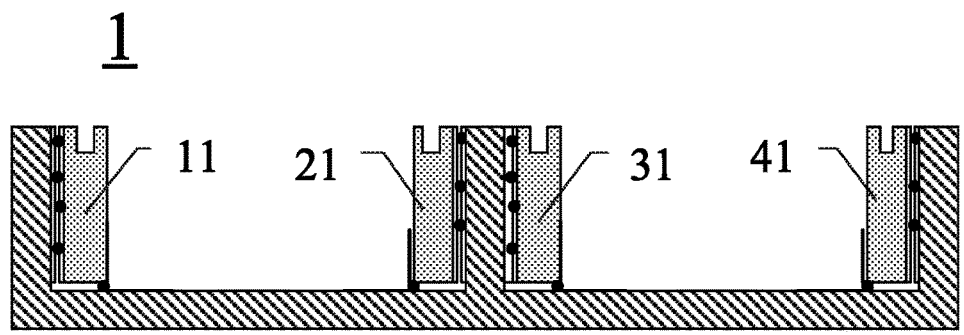
FIG. 4D is a schematic structural sectional view of the foreign substance collection structure along a C-C' line in FIG. 4C.

FIG. 4A is a schematic plan view illustrating a first state of still another foreign substance collection structure provided by an embodiment of the present disclosure; FIG. 4B is a schematic structural sectional view of the foreign substance collection structure in a C-C' line of FIG. 4A; FIG. 4C is a schematic plan view illustrating a second state of still another foreign substance collection structure provided by an embodiment of the present disclosure; and FIG. 4D is a schematic structural sectional view of the foreign substance collection structure in a C-C' line of FIG. 4C.

For instance, as shown in FIGS. 4a-4d, the foreign substance collection structure 1 may be provided with four baffle plates which are respectively the first baffle plate 11, the second baffle plate 21, a third baffle plate 31 and a fourth baffle plate 41, so as to further reduce the height of the foreign substance collection structure 1 on the premise of keeping the width of the foreign substance collection structure 1 unchanged. The components of the foreign substance collection structure 1 may be the same with the above description. No further description will be given here.

Second Embodiment

The embodiment provides a foreign substance collection structure, which comprises: a frame and a first baffle plate. The frame comprises a first inside wall; the first baffle plate is configured to move towards the first inside wall, comprises a first surface, and is capable of being moved from a position away from the first inside wall to a position where the first surface of the first baffle plate faces the first inside wall; and an adhesive layer is disposed on at least one of the first inside wall and the first surface, and the adhesive layer is configured to bond foreign substances appearing on the first inside wall and/or the first surface.

Compared with the first embodiment, the development of automatic production and robot industry is fully considered in the foreign substance collection structure provided by the second embodiment; and the foreign substance collection structure provided by the second embodiment is not provided with a relevant lock structure, does not adopt a relevant lock piece, and adopts an automation device such as an manipulator, a miniature industrial robot or a nanorobot to realize the operations such as the locking and movement of the first baffle plate.

It should be noted that: as for the second baffle plate in the first embodiment, the operations such as the locking and movement of the second baffle plate may also be realized by an automation device such as an manipulator, a miniature industrial robot or a nanorobot.

Third Embodiment

Figure 5A:
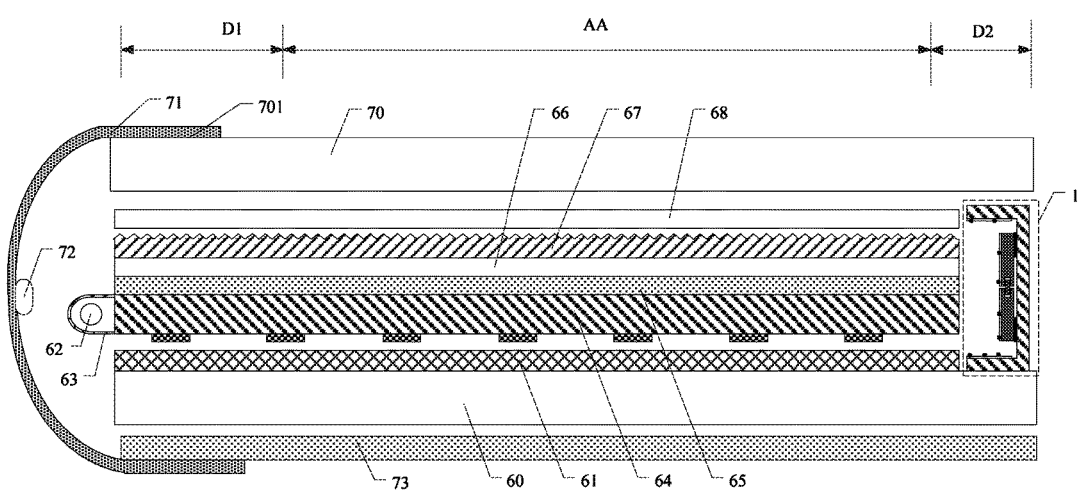
FIG. 5A is a schematic structural view of a display device provided by an embodiment of the present disclosure.
Figure 5B:
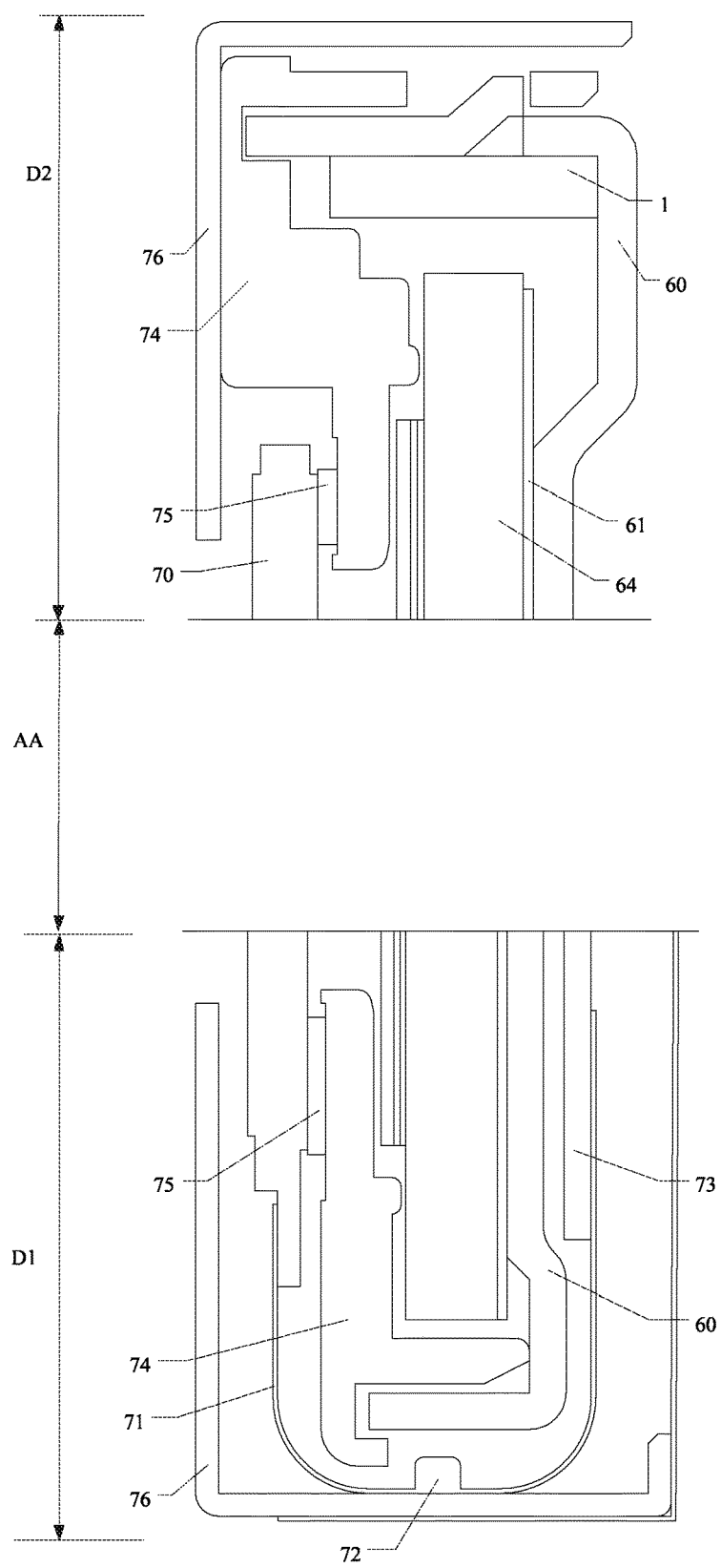
FIG. 5B is a schematic structural view of an assembled complete set of the display device provided by an embodiment of the present disclosure.

FIG. 5A is a schematic structural view of a display device provided by an embodiment of the present disclosure; and FIG. 5B is a schematic structural view of an assembled complete set of a display device provided by an embodiment of the present disclosure.

The embodiment provides a display device, which, as shown in FIG. 5A, the display device comprises at least one foreign substance collection structure 1 provided by the first embodiment or the second embodiment. In the first state, the foreign substance collection structure 1 may utilize the adhesive layer 14 to bond the foreign substances 15 falling into the foreign substance collection structure 1; and in the second state, the foreign substances 15 may be completely sealed into the foreign substance collection structure 1, so as to effectively avoid the escape of the foreign substances 15, achieve the control of the foreign substances 15, and greatly reduce and even eliminate foreign substances appearing on the active area of the display device, which can effectively reduce to occur phenomenon of poor image quality of the active area such as white dirt and white spots caused by the foreign substances, improve the display effect of the display device, and improve the quality and the yield of the display device. For instance, the display device further comprises a display panel 70 and a backlight module. As shown in FIG. 5A, in a specific example, for instance, the backlight module may comprise a multi-layer modular structure composing of a backplane 60, a reflector 61, a light source 62, a light shield 63, a light guide plate (LGP) 64, a first diffuser 65, a first prism film 66, a second prism film 67 and a second diffuser 68 and so on. On the D1 side, the display panel 70 is provided with a bonding area 701; two ends of a flexible circuit board 71 are respectively bonded onto the bonding area 701 of the display panel and a bonding area of a PCB 73, so as to realize the connection of electrical signals between the PCB 73 and the display panel 70; and a drive integrated circuit (IC) 72 is, for instance, directly mounted on the flexible circuit board 71, so as to realize the drive control of the display device.

For instance, the foreign substance collection structure 1 may be disposed a side (namely the D2 side) of the backplane 60 opposite to the bonding area 701, and an opening of the foreign substance collection structure 1 faces the side of the bonding area 701 of the display panel 70. In actual production, in the processes such as the production, performance test, inspection and shipment of the display device, the side (for instance, the D1 side) of the display panel 70 bonded with the PCB 73 is all placed upwards in the vertical direction, and the D2 side is placed downwards in the vertical direction, so most environmental foreign substances will fall into the D2 side; the foreign substance collection structure 1 is disposed on the D2 side and is in the first state, hence the foreign substance collection structure 1 may collect, for instance, foreign substances 15 falling into the foreign substance collection structure 1 from the side of the PCB 73 in these processes; and the adhesive layer 14 of the foreign substance collection structure 1 may effectively fix the foreign substances 15 and prevent the escape of the foreign substances 15.

It should be noted that: in the embodiment, the opening of the foreign substance collection structure 1 refers to a side away from the inner bottom surface 103 of the frame 10 of the foreign substance collection structure.

For instance, as shown in FIG. 5B, in a specific example, the display device may further comprise: sealant 74 disposed on the backlight module and a front frame 76 disposed on the display panel 70. The sealant 74 is configured to bear the display panel 70. Because a surface of the sealant 74 is hard and may have burrs, a gasket 75 may be disposed between the display panel 70 and the sealant 74 and can prevent the display panel 70 from making direct contact with the sealant 74, prevent a lower polarizer of the display panel 70 from being scratched, and avoid the influence on the display quality. The front frame 76 is configured to be locked with the backplane 60 to fix the display panel 70, so that the display panel 70 will not wobble. After the display device is assembled into a complete set, the side (for instance, the D2 side) provided with the foreign substance collection structure 1 is placed upwards in the vertical direction. Because the foreign substance collection structure 1 is in the second state at this stage, the collected foreign substances 15 are fixed between the first inside wall 101 of the frame 10 and the first surface 110 of the first baffle plate 11, which can effectively reduce or eliminate the foreign substances 15 appearing on the active area, prevent the active area from occurring the phenomenon of poor image quality such as white dirt and white spots, improve the display effect of the display device, and improve the quality and the yield of the display device.

It should be noted that: in the process of forming the multi-layer modular structure in the backlight module, foreign substances produced at positions of the multi-layer modular structure close to the foreign substance collection structure 1 may also fall into the foreign substance collection structure 1 and be collected, so as to reduce foreign substances among various layers of the backlight module and optimize the performances of the backlight module.

For instance, the foreign substance collection structure 1 may be bonded with the backplane 60 by the viscose. For instance, the viscose may be UV adhesive. The UV adhesive is coated between the foreign substance collection structure 1 and the backplane 60 at first, and then the foreign substance collection structure 1 is fixed on the backplane 60 by adopting ultraviolet light to irradiate and cure the UV adhesive. The foreign substance collection structure 1 may also be bonded with the backplane 60 by other means. No limitation will be given here in the embodiment of the present disclosure.

For instance, the foreign substance collection structure 1 may adopt a structure as shown in FIGS. 3a-3d, is provided with two baffle plates, can reduce the height of the foreign substance collection structure on the premise of keeping the width of the foreign substance collection structure 1 unchanged, so as to reduce the area of a border of the backplane 60 occupied by the foreign substance collection structure 1, and avoid the border of the backplane 60 being too wide as the foreign substance collection structure 1 is bonded to the backplane 60. The foreign substance collection structure 1 may also adopt the structure as shown in FIGS. 4a-4d, so as to further reduce the height of the foreign substance collection structure and reduce the width of the border of the backplane 60.

For instance, the display device may comprise a plurality of foreign substance collection structures 1. In the direction perpendicular to the backplane 60, the plurality of foreign substance collection structures 1, for instance, may be stacked with each other. The plurality of foreign substance collection structures 1 can increase the surface area of the adhesive layer 14, and hence can ensure that the foreign substances 15 are completely collected.

Fourth Embodiment

Figure 6:
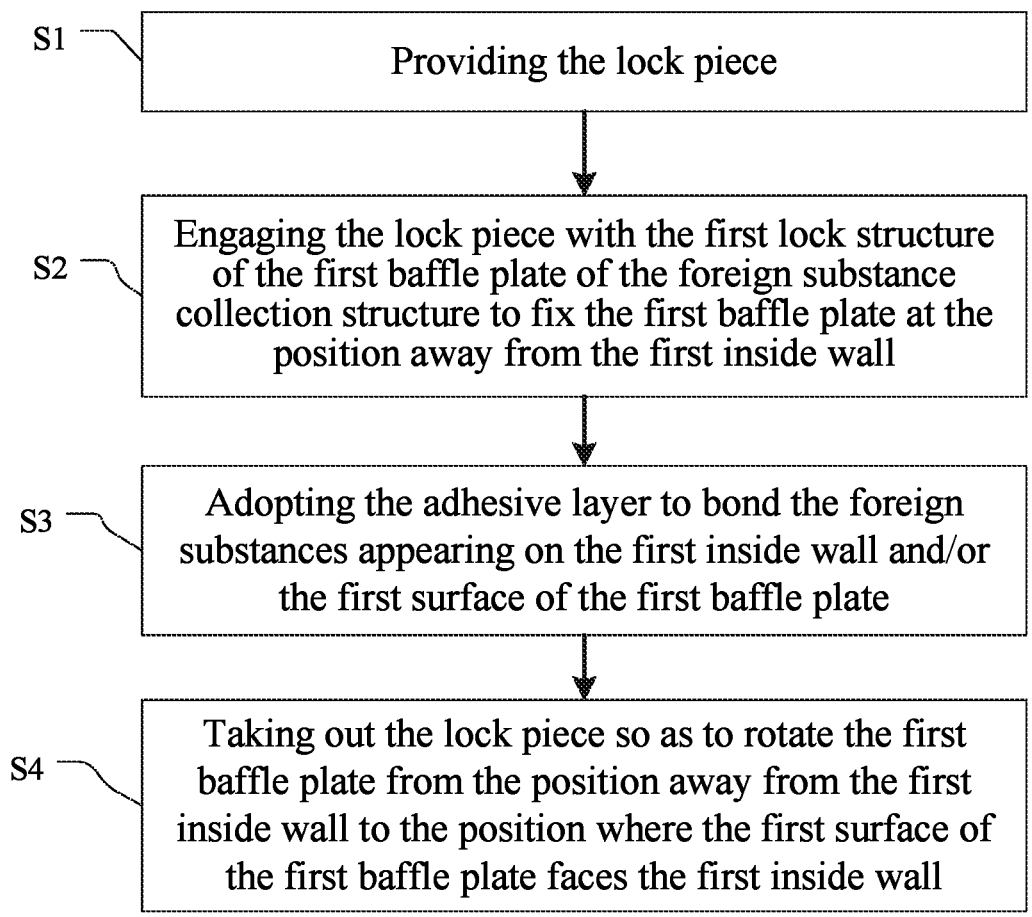
FIG. 6 is a flow diagram of an operation method of a display device provided by an embodiment of the present disclosure.

FIG. 6 is a flow diagram of an operation method of the display device provided by an embodiment of the present disclosure.

The embodiment provides an operation method for any one display device as mentioned above, which comprises the following steps:

S1: providing the lock piece 14;

S2: engaging the lock piece 14 with the first lock structure 112 of the first baffle plate 11 of the foreign substance collection structure 1 to fix the first baffle plate 11 at the position away from the first inside wall 101;

S3: adopting the adhesive layer 14 to bond the foreign substances 15 appearing on the first inside wall 101 and/or the first surface 110 of the first baffle plate 11; and S4: taking out the lock piece 12 so as to rotate the first baffle plate 11 from the position away from the first inside wall 101 to the position where the first surface 110 of the first baffle plate 11 faces the first inside wall 101.

In actual production, in order to protect the electronic components on the PCB 73, the drive IC 72 or the like, in the processes of the production, performance test, inspection and shipment of the display device, a side (for instance, the D1 side) of the display panel 70 bonded with the PCB 73 is all placed upwards in the vertical direction. For instance, in the production process of the display device, the steps S1 and S2 are executed, and the foreign substance collection structure 1 may be in the first state. During the performance test, inspection and shipment of the display device, the step S3 may be executed, and the adhesive layer 14 of the foreign substance collection structure 1 which is disposed on the D2 side may collect and fix the foreign substances 15 appearing on the first inside wall 101 and/or the first surface 110 of the first baffle plate 11. Finally, after the display device is assembled into a complete set, the step S4 is executed. When the entire display device is inverted, namely the side (for instance, the D1 side) of the display panel 70 bonded with the PCB 73 is placed downwards in the vertical direction and a side (for instance, the D2 side) of the display panel 70 provided with the foreign substance collection structure 1 is placed upwards in the vertical direction, because the foreign substance collection structure 1 is in the second state at this stage, the foreign substances 15 are completely sealed into the foreign substance collection structure 1, and no foreign substance will fall onto the active area of the display panel 70, so as to effectively reduce to occur the phenomenon of poor image quality of the display panel 70 such as white dirt and white spots caused by the foreign substances 15, improve the display effect of the display device, and improve the quality and the yield of the display device.

For instance, in the step S2, the lock piece 14 may be inserted into the first groove of the first lock structure 112 to fix the first baffle plate 11 at the position away from the first inside wall 101.

For instance, in the steps S2 and S4, the lock piece 14 may be inserted and/or taken out by manual means. The lock piece 14 may also be inserted and/or taken out by automatic means. For instance, the lock piece 14 may also be inserted and/or taken out by a motor (e.g., a linear motion actuator). No limitation will be given here in the embodiment of the present disclosure.

Fifth Embodiment

The embodiment provides an operation method for any one display device as mentioned above, which may comprise the following steps:

S01: fixing the first baffle plate of the foreign substance collection structure at the position away from the first inside wall by utilization of a device such as a manipulator, a miniature industrial robot or a nanorobot;

S02: allowing the adhesive layer to bond the foreign substances appearing on the first inside wall and/or the first surface of the first baffle plate; and S03: moving the first baffle plate from the position away from the first inside wall to the position where the first surface of the first baffle plate faces the first inside wall by utilization of the device such as the manipulator, the miniature industrial robot or the nanorobot.

The operation method provided by the embodiment utilizes the device such as the manipulator, the miniature industrial robot or the nanorobot to realize the automatic locking and movement of the first baffle plate, and hence can realize the automation of the processes such as the production, inspection and the complete set assembly of the display device.

For the present disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness a layer or area may be enlarged or narrowed, that is, the drawings are not drawn in a real scale.

(3) In case of no conflict, features in one embodiment or in different embodiments can be combined to obtain new embodiment(s).

What are described above are only specific embodiments of the present disclosure, the protection scope of the present disclosure is not limited thereto; the protection scope of the present disclosure should be based on the protection scope of the claims.

What is claimed is:

1. A foreign substance collection structure, comprising:
   a frame comprising a first inside wall; and
   a first baffle plate configured to move toward the first inside wall, wherein the first baffle plate comprises a first surface and is capable of being moved from a position away from the first inside wall to a position where the first surface of the first baffle plate faces the first inside wall;
   wherein an adhesive layer is disposed on at least one of the first inside wall and the first surface, and the adhesive layer is configured to bond foreign substances appearing on the first inside wall and the first surface.

2. The foreign substance collection structure according to claim 1, further comprising: a first actuator configured to move the first baffle plate from the position away from the first inside wall to the position where the first surface of the first baffle plate faces the first inside wall.

3. The foreign substance collection structure according to claim 2, wherein the first actuator comprises a first component and a second component; the first component is disposed on the first baffle plate; the second component is disposed on the frame; and the first actuator is configured to rotate the first baffle plate from the position away from the first inside wall to the position where the first surface of the first baffle plate faces the first inside wall.

4. The foreign substance collection structure according to claim 3, wherein the frame further comprises an inner bottom surface; the first baffle plate further comprises a second surface facing the inner bottom surface;
   the first component is disposed on the second surface and the second component is disposed on the inner bottom surface; or
   the first component is disposed on the first surface and the second component is disposed on the first inside wall.

5. The foreign substance collection structure according to claim 4, further comprising:
   a second baffle plate, wherein
   the frame further comprises a second inside wall parallel to the first inside wall;
   the second baffle plate is configured to be able to move towards the second inside wall, comprises a third surface, and is capable of being moved from a position away from the second inside wall to a position where the third surface of the second baffle plate faces the second inside wall; and
   the adhesive layer is disposed on at least one of the second inside wall and the third surface.

6. The foreign substance collection structure according to claim 2, wherein the first actuator comprises a spring or a hinge.

7. The foreign substance collection structure according to claim 3, further comprising:
   a second baffle plate, wherein
   the frame further comprises a second inside wall parallel to the first inside wall;
   the second baffle plate is configured to be able to move towards the second inside wall, comprises a third surface, and is capable of being moved from a position away from the second inside wall to a position where the third surface of the second baffle plate faces the second inside wall; and
   the adhesive layer is disposed on at least one of the second inside wall and the third surface.

8. The foreign substance collection structure according to claim 2, further comprising:
   a second baffle plate, wherein
   the frame further comprises a second inside wall parallel to the first inside wall;
   the second baffle plate is configured to be able to move towards the second inside wall, comprises a third surface, and is capable of being moved from a position away from the second inside wall to a position where the third surface of the second baffle plate faces the second inside wall; and the adhesive layer is disposed on at least one of the second inside wall and the third surface.

9. The foreign substance collection structure according to claim 1, wherein the first inside wall or the first surface is a rough surface, or both the first inside wall and the first surface are rough surfaces.

10. The foreign substance collection structure according to claim 9, further comprising:
a second baffle plate, wherein
the frame further comprises a second inside wall parallel to the first inside wall;
the second baffle plate is configured to be able to move towards the second inside wall, comprises a third surface, and is capable of being moved from a position away from the second inside wall to a position where the third surface of the second baffle plate faces the second inside wall; and
the adhesive layer is disposed on at least one of the second inside wall and the third surface.

11. The foreign substance collection structure according to claim 1, further comprising: at least one lock piece configured to fix the first baffle plate at the position away from the first inside wall.

12. The foreign substance collection structure according to claim 11, wherein the first baffle plate further comprises a first lock structure; and the first lock structure is configured to be engaged with the lock piece to fix the first baffle plate at the position away from the first inside wall.

13. The foreign substance collection structure according to claim 12, wherein the first lock structure comprises a groove; and the lock piece is capable of being inserted into the groove.

14. The foreign substance collection structure according to claim 1, further comprising:
a second baffle plate, wherein
the frame further comprises a second inside wall parallel to the first inside wall;
the second baffle plate is configured to be able to move towards the second inside wall, comprises a third surface, and is capable of being moved from a position away from the second inside wall to a position where the third surface of the second baffle plate faces the second inside wall; and
the adhesive layer is disposed on at least one of the second inside wall and the third surface.

15. The foreign substance collection structure according to claim 14, further comprising: a second actuator configured to move the second baffle plate from the position away from the second inside wall to the position where the third surface of the second baffle plate faces the second inside wall.

16. The foreign substance collection structure according to claim 14, wherein the second baffle plate further comprises a second lock structure which is configured to fix the second baffle plate at the position away from the second inside wall.

17. The foreign substance collection structure according to claim 14, wherein the second inside wall or the third surface is a rough surface, or both the first inside wall and the first surface are rough surfaces.

18. A display device, comprising at least one foreign substance collection structure according to claim 1.

19. The display device according to claim 18, further comprising: a display panel and a backlight module, wherein
the display panel is provided with a bonding area; the backlight module comprises a backplane; and the foreign substance collection structure is disposed on a side of the backplane opposite to the bonding area.

20. An operation method of the display device according to claim 18, comprising the following steps:
fixing the first baffle plate at the position away from the first inside wall;
allowing the adhesive layer to bond foreign substances appearing on the first inside wall and/or the first surface of the first baffle plate; and
moving the first baffle plate from the position away from the first inside wall to the position where the first surface of the first baffle plate faces the first inside wall.

* * * * *